US010822150B2

(12) United States Patent
Shi et al.

(10) Patent No.: US 10,822,150 B2
(45) Date of Patent: Nov. 3, 2020

(54) PACKAGE FOR INDICATING HEAT-SEAL CONDITION

(71) Applicant: Bemis Company, Inc., Neenah, WI (US)

(72) Inventors: Xiangke Shi, Neenah, WI (US); Yuan Liu, Neenah, WI (US)

(73) Assignee: Bemis Company, Inc., Neenah, WI (US)

( * ) Notice: Subject to any disclaimer, the term of this patent is extended or adjusted under 35 U.S.C. 154(b) by 144 days.

(21) Appl. No.: 15/578,815

(22) PCT Filed: Jun. 3, 2015

(86) PCT No.: PCT/US2015/033978
§ 371 (c)(1),
(2) Date: Dec. 1, 2017

(87) PCT Pub. No.: WO2016/195675
PCT Pub. Date: Dec. 8, 2016

(65) Prior Publication Data
US 2018/0099802 A1    Apr. 12, 2018

(51) Int. Cl.
*B65D 79/02* (2006.01)
*B65D 75/30* (2006.01)
(Continued)

(52) U.S. Cl.
CPC ............ *B65D 79/02* (2013.01); *B65D 75/30* (2013.01); *B65D 75/5855* (2013.01);
(Continued)

(58) Field of Classification Search
CPC .... B65D 79/02; B65D 75/30; B65D 75/5855; G01N 21/8803; G01N 21/78
See application file for complete search history.

(56) References Cited

U.S. PATENT DOCUMENTS 3,616,898 A    11/1971 Massie
4,097,288 A     6/1978 Lawton
(Continued)

FOREIGN PATENT DOCUMENTS

JP    05158010 A  *  6/1993
JP    H05158010 A    6/1993
(Continued)

OTHER PUBLICATIONS

"Demonstrating Color Transitions of Leuco Dye-Based Thermochromic Inks as a Teaching Approach in Textile and Fashion Design", M. Kooroshnia, Nordic Design Research Conference 2013, Copenhagen-Malmö, pp. 173-181.

*Primary Examiner* — Steven A. Reynolds
*Assistant Examiner* — Javier A Pagan
(74) *Attorney, Agent, or Firm* — Lynn M. Nett

(57) ABSTRACT

The present invention is directed to heat-seal condition indicating packages having a first sealing substrate comprising a leuco dye and a second sealing substrate comprising a leuco dye developer, and a leuco dye sensitizer which dissolves both the leuco dye and the leuco dye developer when melted which is disposed in or on the surface of either the first or second sealing substrata or disposed in or on the surface of both the first and second sealing substrates. The packages of the present invention further include a heat-seal produced between the first sealing substrate and the second sealing substrate which comprises a heat-seal defect-free state which produces a visible color change within the heat-seal after heat sealing, and/or a heat-seal defect state which produces no visible color change within the heat-seal after heat sealing.

20 Claims, 1 Drawing Sheet

(51) Int. Cl.
*B65D 75/58* (2006.01)
*G01N 21/78* (2006.01)
*G01N 21/88* (2006.01)
*G01N 31/22* (2006.01)

(52) U.S. Cl.
CPC ......... *G01N 21/78* (2013.01); *G01N 21/8803* (2013.01); *G01N 31/229* (2013.01)

(56) References Cited

U.S. PATENT DOCUMENTS

| | | | |
|---|---|---|---|
| 4,516,679 A * | 5/1985 | Simpson | B65D 75/52 |
| | | | 206/459.1 |
| 4,714,595 A | 12/1987 | Anthony et al. | |
| 5,066,633 A | 11/1991 | Shibata et al. | |
| 5,184,190 A | 2/1993 | Rai et al. | |
| 5,206,118 A | 4/1993 | Sidney et al. | |
| 5,727,684 A * | 3/1998 | Webb | B65D 75/52 |
| | | | 206/439 |
| 5,787,681 A | 8/1998 | Papina et al. | |
| 6,059,319 A | 5/2000 | Wyke | |
| 6,471,058 B2 | 10/2002 | Kannabiran et al. | |
| 6,596,354 B1 | 7/2003 | Longdon et al. | |
| 7,464,518 B2 | 12/2008 | Ansinn | |
| 7,673,498 B2 | 3/2010 | De Baerdemacher et al. | |
| 7,829,497 B2 * | 11/2010 | Filosa | B41M 5/3275 |
| | | | 503/213 |
| 8,387,348 B2 | 3/2013 | Caudle et al. | |
| 2008/0145940 A1 | 6/2008 | Menon | |
| 2009/0117389 A1 * | 5/2009 | Amberg-Schwab | C09D 4/00 |
| | | | 428/423.1 |
| 2009/0143516 A1 | 6/2009 | MacDonald et al. | |
| 2011/0127188 A1 * | 6/2011 | Thompson | B32B 27/08 |
| | | | 206/438 |
| 2014/0044609 A1 * | 2/2014 | Prusik | G01K 11/12 |
| | | | 422/429 |
| 2014/0342903 A1 | 11/2014 | Jarvis et al. | |

FOREIGN PATENT DOCUMENTS

| | | | |
|---|---|---|---|
| JP | 07271302 | * | 3/1994 |
| JP | H07271302 A | | 3/1994 |
| WO | 9604177 A2 | | 8/1994 |
| WO | 2004087430 A1 | | 4/2003 |
| WO | WO 2004087430 | * | 4/2004 |
| WO | 2008024537 A2 | | 2/2008 |

* cited by examiner

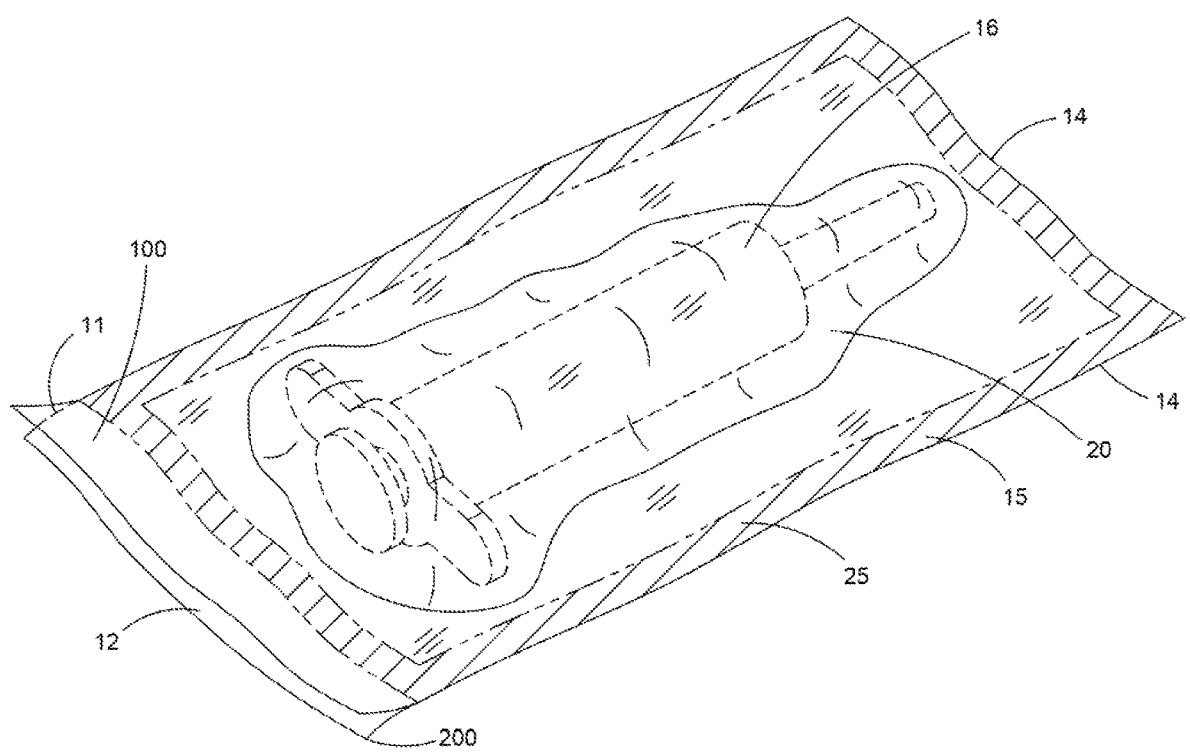

PACKAGE FOR INDICATING HEAT-SEAL CONDITION

BACKGROUND OF THE INVENTION

The present invention relates to the manufacture of sealed hermetic and/or sterile packages and more particularly to packages formed from packaging materials which can indicate defects and flaws in heat-seal areas of these packages.

A broad range products are packaged in airtight conditions in order to prolong shelf life, to guarantee its quality, or to preserve its sterility. Such products range from food and beverages to medical, electrical and pharmaceutical items. A crucial point in the packaging process is to ensure a high quality sealing of the package. Seal quality encompasses several issues such as airtightness, inclusions, strength and visual appearance. If the seal does not meet the quality requirements, the product can be rejected by the consumer based on the visual appearance of the package, or in case of no airtightness, the quality of the product inside the package could rapidly deteriorate in terms of visual appearance, flavor, sterility and microbial safety and, hence, consumer health.

Heat-seals in plastic films are generally formed by a band sealer that, through the application of heat and pressure over a narrow area in the plastic films, partially melts and fuses the thermoplastic substrates in the plastic films. The quality of the seal is affected by a number of variables such as the temperature of the process, the pressure exerted on the sealing substrates, the cleanness of the sealing process. Flaws and defects can be encountered during the sealing process when the band sealer temperature, transitional speed or pressure varies, when the film substrates wrinkle or twist during sealing, or when foreign material is introduced into the seal. The inclusion of flaws and defects into the seal produce weak seals that may deteriorate and fail under the intended specific application. Failure of the seal can have disastrous and costly effects ranging from product spoilage to loss of sterility in medical applications.

Accordingly, there is, therefore, a need in the art for packaging materials which can indicate the integrity of a heat-seal.

SUMMARY OF THE INVENTION

The present invention is directed to heat-seal condition indicating packages having a first sealing substrate comprising a leuco dye and a second sealing substrate comprising a leuco dye developer, and a leuco dye sensitizer which dissolves both the leuco dye and the leuco dye developer when melted. The leuco dye sensitizer may be disposed in or on the surface of the first sealing substrate and/or in or on the surface of the second sealing substrate. The packages of the present invention further includes a heat-seal produced between the first sealing substrate and the second sealing substrate which comprises a heat-seal defect-free state which produces a visible color change within the heat-seal after heat sealing, and/or a heat-seal defect state which produces no visible color change within the heat-seal after heat sealing.

An important aspect of the heat-seal condition indicating packages of the present invention is that a color change within the heat-seal is generated when the first sealing substrate fusion seals to the second sealing substrate by application of heat and pressure. Thus, if the heat sealing process is performed properly and there are no flaws or defects present, the entire sealing area changes from colorless to a non-white or colored appearance to indicate a heat-seal defect-free state. It is during the fusion sealing process that the leuco dye sensitizer melts and dissolves the leuco dye and the leuco dye developer which then react together to form the colored appearance. The mixing of these color components typically does not occur by heat alone, but requires the sealing substrates to be pressed together under pressure. When there is sufficient fusion and mixing of the first sealing substrate with the second sealing substrate, a colored appearance occurs indicating the heat-seal defect-free state within the heat-seal. However, when there is a defect or flaw present, for example, debris such as dust or dirt between the two sealing substrates or not enough heat provided to melt the leuco dye sensitizer, the debris or other defects will interfere with the mixing of the color components or melting of the leuco dye sensitizer within a localized area of the heat-seal. Consequently, there will not be a color change where the debris is present in the seal area. The abstinence of a color change within a localized area of the seal area corresponds to a heat-seal defect state between the first and second sealing substrates. If the debris is present across the entire heat-seal area, then there will not be a color change across the entire heat-seal area. Thus, the heat-seal condition indicating packages of the present invention can exhibit either a heat-seal defect-free state, a heat-seal defect state or both a heat-seal defect-free state and a heat-seal defect state.

In one preferred embodiment, the leuco dye is incorporated into the first sealing substrate using conventional resin blending technology known in the art.

In another preferred embodiment, the leuco dye is applied onto the first sealing substrate using conventional printing methods known in the art.

In another preferred embodiment, the leuco dye developer and leuco dye sensitizer are both applied onto the second sealing substrate using conventional printing methods known in the art.

In yet another preferred embodiment, the leuco dye developer and leuco dye sensitizer are both incorporated into the second sealing substrate using conventional resin blending technology known in the art.

In embodiments of the invention, suitable classes of leuco dyes include fluorans, rhodamines, and triarylmethane lactone leuco dyes. These compounds react with acidic developing agents, such as Lewis acids, salicylic acids, phenolic compounds, or acidic clays, to form highly colored species by the opening of a lactone ring. Specific, examples of such compounds include without limitation those known under the trade name "PERGASCRIPT" (Ciba Specialty Chemicals of Tarrytown, N.Y.). Another leuco dye useful in embodiments of the invention is the leuco dye crystal violet lactone (a triarylmethane lactone). In its lactone form, crystal violet lactone is colorless or slightly yellow. But, in a low pH environment, it becomes protonated and exhibits an intensely violet color, such as crystal violet lactone having the structure:

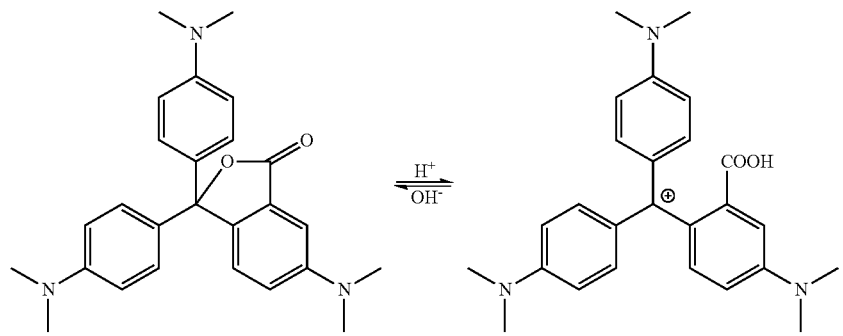

Generally, leuco dyes are substantially colorless, and upon addition of one or two hydrogen atoms, convert to a colored dye. A wide variety of specific leuco dyes within the above mentioned categories may be suitable for use in the present invention and are known to those skilled in the art. A more detailed discussion of these types of leuco dyes may be found in U.S. Pat. Nos. 3,658,543 and 6,251,571, each of which are hereby incorporated by reference in their respective entireties. The following non-limiting listing of leuco dyes are suitable for use herein, either individually or in combinations of two or more: acyl auramines, acylleucophenothiazines, alpha-unsaturated aryl ketones, azaphthalides, benzoyl leuco methylene blue, benzoyl leuco oxazine, benzoyl leuco thiazine, beta-unsaturated aryl ketones, basic mono azo dyes, bisindolylphthalide, 10-benzoyl-N,N,N,N-tetraethyl-3,7-diamino-10H-phenoxazine, carbazolyl blue, chromogenic azaphthalide compounds, crystal violet lactone, diaryl phthalides, diphenylmethanes, dithio-oxamide, di[bis-(indoyl)ethyleneyl]tetraholophthalides, fluoran, green lactone, 3-(indol-3-yl)-3-(4-substituted aminophenyl)phthalides, indolyl bis-(indoyl)ethylenes, indolyl red, leucoauramines, leucobenzoyl methylene blue, leuco malachite green, 3-methyl-2,2-spirobi(benzo-[f]-chromene), phenoxazine, phthalide leuco dyes, phthlans, polystyrl carbinols and 8-methoxybenzoindolinospiropyrans, rhodamine beta lactams, spiropyrans, substituted 4,7-diazaphthalides, sultines, para-toluene sulfonate of Michler's hydrol, triarylmethane, triphenylmethanes (gentian violet and malachite green), 3,3-diaryl-3H-2,1-benzoxathiole 1-oxides and mixtures thereof.

As stated, interaction between a leuco dye and a leuco dye developer resulting from the dissolution of these components by the melted leuco dye sensitizer causes a chemical change to take place, thereby altering the color of the leuco dye from substantially white or colorless to substantially colored in appearance. The colored appearance can be generally a dark color such as black or deep colors having a high optical density. Generally, the chemical change in the leuco dye occurs upon application of a predetermined amount of heat and pressure. It should be noted that by varying the melting point of the leuco dye sensitizer, the temperature at which the color change occurs can be readily controlled.

Preferably, the leuco dye and leuco dye developer are both low toxic compounds and are suitable for use in food and medical packaging applications.

A leuco dye developer can be referred to as electron acceptors but are more accurately described as proton donors. In certain embodiments, the developing agent is water insoluble. In some embodiments, the developing agent is a weak acid selected from, octyl p-hydroxybenzoate, methyl p-hydroxybenzoate, 1,2,3-triazoles, 4-hydroxycoumarin derivatives, and combinations of two or more of the foregoing. In some embodiments, Lewis acids such as asleuco dye may be used as a developer. Examples of such developers include activated clay substances, such as attapulgite, acid clay, bentonite, montmorillonite, acid-activated bentonite or montmorillonite, zeolite, hoalloysite, silicon dioxide, aluminum oxide, aluminum sulfate, aluminum phosphate, hydrated zirconium dioxide, zinc chloride, zinc nitrate, activated kaolin or other clay. In other embodiments, acidic, organic compounds are useful as a leuco dye developer. Examples of such developers include ring-substituted phenols, resorcinols, salicylic acids (e.g., 3,5-bis (α,α'-dimethylbenzyl) salicylic; 3,5-bis ((γ-methylbenzyl) salicylic acid), or salicyl acid esters and metal salts thereof (e.g., zinc salts). Additional acidic, organic compounds include certain polymeric materials such as, for example, a phenolic polymer, an alkylphenolacetylene resin, a maleic acidicolophonium resin or a partially or fully hydrolyzed polymer of maleic anhydride with styrene, ethylene or vinyl methyl ether, or carboxymethylene. Mixtures of two or more of the monomeric and polymeric acidic, organic compounds may also be used.

In still other embodiments, the leuco dye developer may be selected from phenolic resins or phenolic compounds such as 4-tert-butylphenol; 4-phenylphenol; methylene-bis (p-phenylphenol); 4-hydroxydiphenyl ether; alpha-naphthol; beta-napthol; methyl 4-hydroxybenzoate; benzyl 4-hydroxybenzoate; 4-hydroxydiphenyl sulfone; 4-hydroxyacetophenone; 2,2'-dihydroxydiphenyl; 4,4'-cyclohexylidenephenol; 4,4'-isopropylidenediphenol; 4,4-isopropylidenebis(2-methylphenol); a pyridine complex of zinc thiocyanate; 4,4-bis(4-hydroxyphenyl)valeric acid; hydroquinone; pyrogallol; phoroglucine; p-hydroxybenzoic acid; m-hydroxybenzoic acid; o-hydroxybenzoic acid; gallic acid; 1-hydroxy-2-naphthoic acid.

In one preferred embodiment, the leuco dye developer comprises a weak acid selected from the group consisting of bisphenol A, bisphenol S, octyl p-hydroxybenzoate, methyl p-hydroxybenzoate, 1,2,3-triazoles, 4-hydroxycoumarin derivatives, and combinations thereof.

In another preferred embodiment, the leuco dye developer comprises an organic compound selected from the group consisting of ring-substituted phenols, ascorbic acids, octadecanoic acids (skeane acids), resorcinols, salicylic acids.

In another preferred embodiment, the leuco dye developer has a pKa of between 3 and 10.

In a more preferred embodiment, leuco dye developer is octadecanoic acid.

A leuco dye sensitizer can refer to any compound which in its melted state is capable of dissolving both the leuco dye and the leuco dye developer. The leuco dye sensitizer is intended to facilitate the mixing of the leuco dye and leuco dye developer when the sensitizer has melted. In preferred embodiments, the leuco dye sensitizer has a melting point of between 23° C. and 149° C. which readily dissolves both of the leuco dye and leuco dye developer within this temperature range. In preferred embodiments, the leuco dye sensitizer may be incorporated into the first sealing substrate or applied to the surface of the first sealing substrate. Alternatively, in other preferred embodiments, the leuco dye sensitizer may be incorporated into the second sealing substrate or applied to the surface of the second sealing substrate. It is also contemplated that in further preferred embodiments; the leuco dye sensitizer is incorporated into the first and second sealing substrates or applied to the surfaces of the first and second sealing substrates.

In one preferred embodiment, the leuco dye sensitizer is 2,2'-ethylidenebis (4,6-di-tert-butylphenol). Non-limiting examples of commercially available leuco dye sensitizers are sold under the trademark Irganox® supplied by BASF Corporation (Ludwigshafen, Germany). A particular suitable leuco dye sensitizer is Irganox® 129.

The thermoplastic matrix of the first sealing substrate may include any packaging material known in the art. These may include, but are not limited to, polyethylenes such as low density polyethylene ("LDPE"), linear low density polyethylene ("LLDPE") very low density polyethylene ("VLDPE"), ultra-low density polyethylene ("ULDPE"), medium density polyethylene ("MDPE"), high density polyethylene ("HDPE"), polyethylenes comprising copolymers of ethylene with one or more ethylene/alpha-olefins ("ethylene/α-olefins") such as butene-1, hexene-1, octene-1, or the like as a comonomer, ethylene/propylene copolymers, polypropylene, propylene/ethylene copolymer, polyisoprene, polybutylene, polybutene, poly-3-methylbutene-1, poly-4-methylpentene-1, ionomers and the like. Low density polyethylene ("LDPE") can be prepared at high pressure using free radical initiators, or in gas phase processes using Ziegler-Natty or vanadium catalysts, and typically has a density in the range of 0.916-0.940 g/cm$^3$. LDPE is also known as "branched" or "heterogeneously branched" polyethylene because of the relatively large number of long chain branches extending from the main polymer backbone. Polyethylene in the same density range, i.e., 0.916 to 0.940 g/cm$^3$, which is linear and does not contain long chain branching is also known; this "linear low density polyethylene" ("LLDPE") can be produced with conventional Ziegler-Natta catalysts or with metallocene catalysts. As used in the present disclosure, the term "linear" is applied to a polymer that has a linear backbone and does not have long chain branching; i.e., a "linear" polymer is one that does not have the long chain branches. Relatively higher density LDPE, typically in the range of 0.928 to 0.940 g/cm$^3$, is sometimes referred to as medium density polyethylene ("MDPE"). Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylene ("VLDPE") is also known. VLDPEs can be produced by a number of different processes yielding polymers with different properties, but can be generally described as polyethylenes having a density less than 0.916 g/cm$^3$, typically 0.890 to 0.915 g/cm$^3$ or 0.900 to 0.915 g/cm$^3$. Other non-limiting examples of suitable thermoplastic resins for the first sealing substrate include ethylene vinyl acetate copolymers (EVA), blends of polyethylene and ethylene vinyl acetate copolymers, cyclic olefin copolymers (COC), polyvinyl chlorides (PVC), polyvinylidene chlorides (PVdC), polychlorotrifluoroethylene (PCTFE), commonly referred to as ACLAR® (Honeywell/Allied Signal), polypropylene (PP), high impact polystyrene (HIPS), general purpose polystyrene (GPPS), styrene block copolymer (SBC), polyethylene terephthalate (PET), oriented polyethylene terephthalate (OPET), amorphous polyethylene terephthalate (APET), glycol-modified polyethylene terephthalate PETG), polylactic acid (PLA) and blends thereof. In preferred embodiments, the thermoplastic matrix of the first sealing substrate is an ethylene vinyl acetate copolymer or a blend of ethylene vinyl acetate copolymer and polyethylene. The first sealing substrate may include any number of additional film layers depending upon the final requirements of the package. In a preferred embodiment, the first sealing substrate is thermoformed. In another preferred embodiment, the first sealing substrate is a sealing layer of a multilayer film.

The second sealing substrate may include the same thermoplastic material used for the first sealing substrate or may be a different material such as paper or a non-woven material. Preferably, the paper or nonwoven material should be porous and have a sufficiently low pore size to prevent penetration by bacteria and other microbial organisms but with sufficiently high pore size to allow gases and/or water vapor to pass through the pores. In a preferred embodiment, the materials for use as the second sealing substrate include, but are not limited to medical grade Kraft paper, especially, uncoated medical grade Kraft paper. A non-limiting example of such paper includes Arjo Ethypel® 60 gram/m$^2$ paper (Arjowiggins SAS, Boulogne Billancourt, France). Additional preferred non-woven materials include spunbonded nonwoven polyolefins such as, but are not limited to, the family of materials sold under the trademark DuPont™ Tyvek® (E.I. du Pont de Nemours and Company, Wilmington, Del., USA). The second sealing substrate may include any number of additional film layers depending upon the final requirements of the package.

As used herein, the terms "heat-seal" and the like refer to a first portion of a film surface (i.e., formed from a single layer or multiple layers) which is capable of forming a hermetic fusion bond to a second portion of a film surface typically under heat and pressure. A heat-seal layer is capable of fusion bonding by conventional indirect heating means which generate sufficient heat on at least one film contact surface for conduction to the contiguous film contact surface and formation of a bond interface therebetween without loss of the film integrity. It should be recognized that heat sealing can be performed by any one or more of a wide variety of manners, such as using a heat-seal technique (e.g., melt-bead sealing, thermal sealing, impulse sealing, ultrasonic sealing, hot air, hot wire, infrared radiation, etc.).

BRIEF DESCRIPTION OF THE DRAWINGS

Further features and advantages of the present invention will become apparent from the following detailed description, taken in combination with the appended drawings, in which:

FIG. 1 is a schematic view of one embodiment of a package according to the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Shown in FIG. 1 is one embodiment of a heat-seal condition indicating package 10 of the present invention comprises a thermoformed component 11 which is formed from a first sealing substrate 100, and a lidding component 12 which is formed from a second sealing substrate 200. The lidding component 12 is adhered to the thermoformed component 11 by a heat and pressure activated heat-seal 15. The heat and pressure activated heat-seal 15 is generally adjacent to a peripheral edge 14 of lidding component 12 and provides a border which surrounds a product cavity 20 for receiving a product 16. In this particular preferred embodiment, package 10 is a gas-sterilizable medical package. When there is sufficient fusion of the first sealing substrate 100 with the second sealing substrate 200, a colored appearance occurs indicating a heat-seal defect-free state 25 within the heat-seal 15. However, when there is a defect or flaw present, the defect will interfere with the mixing of the color components within heat-seal 15. Consequently, there will not be a color change where the defect is present in the heat-seal, and a heat-seal defect state (not shown) will be evident in this particular example, heat-seal 15 is configured as a fin seal.

In this particular embodiment, the product cavity 15 is formed into the general shape of the product 16 contained therein. Nevertheless, one skilled in the art would appreciate that the thermoformed component 11 may be formed into any shape as desired and may be of various sizes. Package 10 is particularly well suited for packaging of medical products such as, but not limited to, syringes and the like since the paper or nonwoven material of second sealing substrate 200 is porous to gases such as ethylene oxide thus allowing the package contents to be sterilized prior to its ultimate use. It should be understood that package 10 may also package other products such as non-medical products including food items. While package 10 is depicted as having only one cavity 13, it is also contemplated that thermoformed component 11 of the present invention may include multiple cavities (not shown). While the package depicted in FIG. 1 is shown having a thermoformed component 11, it is also contemplated that the packages of the present invention include bags and pouches which are generally not thermoformed but have a flat component (not shown).

SEALING SUBSTRATE EXAMPLES

Example 1

In this example, 5 grams of leuco dye of crystal violet lactone was dry blended with 1995 grams of ethylene vinyl acetate copolymer (EVA) (having 2% vinyl acetate content) resin by simply mixing by hand before extrusion. The mixture was fed into a single screw extruder hopper. The single screw extruder temperature profile was set to be (200° F., 250° F., 300° C., 330° F. 330° F.) and the dye temperature was set to be 330° F. The screw speed of the extruder was set to be 40 RPM. A 2 mil thick monolayer film was then extruded from this mixture to form the first sealing substrate. A solution containing a 10% (wt) leuco dye developer of octadecanoic acid (stearic acid) and a 10% (wt.) leuco dye sensitizer of 2,2'-ethylidenebis (4,6-di-tert-butylphenol) (Irganox® 129) in isopropyl alcohol was prepared. A 1-mil aliquot of the solution was coated onto a DuPont™ Tyvek® film to form the second sealing substrate. A one-inch wide strip of each substrate was cut and then heat sealed together at 300° F. (149° C.) under 30 psi with a dwell time of one second.

Example 2

In this example, the first sealing substrate was prepared identical to Example 1 above. A first solution of a 10% (wt.) leuco dye sensitizer of 2,2'-ethylidenebis (4,6-di-tert-butylphenol) (Irganox® 129) in isopropyl alcohol was prepared. A second solution of a 10% (wt.) leuco dye developer of ascorbic acid in water was prepared. A 1-mil aliquot of each solution was then coated onto a Tyvek® film to form the second sealing substrate. A one-inch wide strip of each substrate was cut and then heat sealed together at 300° F. (149° C.) under 30 psi with a dwell time of one second.

Example 3

In this example, the first sealing substrate was prepared identical to Example 1 above. A solution containing a 10% (wt.) leuco dye developer of bisphenol A and a 10% (wt.) leuco dye sensitizer of 2,2'-ethylidenebis (4,6-di-test-butylphenol) (Irganox® 129) in isopropyl alcohol was prepared. A 1-mil aliquot of the solution was coated onto a Tyvek® film to form the second sealing substrate. A one-inch wide strip of each substrate was cut and then heat sealed together at 300° F. (149° C.) under 30 psi with a dwell time of one second.

Example 4

In this example, the first sealing substrate was prepared identical to Example 1 above. A solution containing a 10% (wt.) leuco dye developer of bisphenol S and a 10% (wt.) leuco dye sensitizer of 2,2'-ethylidenebis (4,6-di-tert-butylphenol) (Irganox® 129) in isopropyl alcohol was prepared. A 1-mil aliquot of the solution was coated onto a Tyvek® film to form the second sealing substrate. A one-inch wide strip of each substrate was cut and then heat sealed together at 300° F. (149° C.) under 30 psi with a dwell time of one second.

Example 5

In this example, the first sealing substrate was prepared identical to Example 1 above. A solution containing a 10% (wt.) leuco dye developer of octadecanoic acid (stearic acid) with no leuco dye sensitizer in isopropyl alcohol was prepared. A 1-mil aliquot of the solution was coated onto a Tyvek® film to form the second sealing substrate. A one-inch wide strip of each substrate was cut and then heat sealed together at 300° F. (149° C.) under 30 psi with a dwell time of one second.

Example 6

In this example, the first sealing substrate was prepared identical to Example 1 above. A solution containing a 10% (wt.) leuco dye developer of bisphenol A with no leuco dye sensitizer in isopropyl alcohol was prepared. A 1-mil aliquot of the solution was coated onto a Tyvek® film to form the second sealing substrate. A one-inch wide strip of each substrate was cut and then heat sealed together at 300° F. (149° C.) under 30 psi with a dwell time of one second.

The observations of each of the examples were recorded and the results reported in TABLE 1 below:

TABLE 1

| | Leuco Dye | Leuco Dye Developer | Leuco Dye Sensitizer | Observations |
|---|---|---|---|---|
| Example 1 | Crystal Violet | Stearic acid | Irganox 129 | Bright blue after sealing |
| Example 2 | Crystal Violet | Ascorbic acid | Irganox 129 | Bright blue after sealing, but faded quickly |
| Example 3 | Crystal Violet | Bisphenol A | Irganox 129 | Bright blue after sealing |
| Example 4 | Crystal Violet | Bisphenol S | Irganox 129 | Bright blue after sealing |
| Example 5 | Crystal Violet | Stearic acid | — | No color observed after sealing |
| Example 6 | Crystal Violet | Bisphenol A | — | No color observed after sealing |

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

What is claimed:

1. A heat-seal condition indicating package comprising:
a first sealing substrate comprising a leuco dye;
a second sealing substrate comprising a leuco dye developer;
a leuco dye sensitizer which dissolves both the leuco dye and the leuco dye developer when melted disposed in or on the surface of the first sealing substrate and/or the second sealing substrate; and
a heat-seal produced between the first sealing substrate and the second sealing substrate comprising a heat-seal defect-free state existing between the first sealing substrate and the second sealing substrate which produces a visible color change within the heat-seal after heat sealing the first sealing substrate to the second sealing substrate, and wherein the leuco dye and the leuco dye developer react together to form the visible color change.

2. A package according to claim 1, wherein the leuco dye is selected from the group consisting of acyl auramines, acylleucophenothiazines, alpha-unsaturated aryl ketones, azaphthalides, benzoyl leuco methylene blue, benzoyl leuco oxazine, benzoyl leuco thiazine, beta-unsaturated aryl ketones, basic mono azo dyes, bisindolylphthalide, 10-benzoyl-N,N,N,N-tetraethyl-3,7-diamino-10H-phenoxazine, carbazolyl blue, chromogenic azaphthalide compounds, crystal violet lactone, diaryl phthalides, diphenylmethanes, dithio-oxamide, di[bis-(indoyl)ethyleneyl]tetra holophthalides, fluoran, green lactone, 3-(indol-3-yl)-3-(4-substituted aminophenyl)phthalides, indolyl bis-(indoyl)ethylenes, indolyl red, leucoauramines, leucobenzoyl methylene blue, leuco malachite green, 3-methyl-2,2-spirobi(benzo-[f]-chromene), phenoxazine, phthalide leuco dyes, phthlans, polystyrl carbinols and 8-methoxybenzoindolinospiropyrans, rhodamine beta lactams, spiropyrans, substituted 4,7-diazaphthalides, sultines, para-toluene sulfonate of Michler's hydrol, triarylmethane, triphenylmethanes (gentian violet and malachite green), 3,3-diaryl-3H-2,1-benzoxathiole 1-oxides and mixtures thereof.

3. A package according to claim 1, wherein the leuco dye is crystal violet lactone.

4. A package according to claim 1, wherein the leuco dye is incorporated into the first sealing substrate.

5. A package according to claim 1, wherein the leuco dye is applied onto the first sealing substrate.

6. A package according to claim 1, wherein the leuco dye developer and the leuco dye sensitizer are both coated onto the second substrate.

7. A package according to claim 1, wherein the leuco dye developer and the leuco dye sensitizer are both incorporated into the second substrate.

8. A package according to claim 1, wherein the leuco dye developer comprises a weak acid selected from the group consisting of bisphenol A, bisphenol S, octyl p-hydroxybenzoate, methyl p-hydroxybenzoate, 1,2,3-triazoles, 4-hydroxycoumarin derivatives, and combinations thereof.

9. A package according to claim 1, wherein the leuco dye developer comprises an organic compound selected from the group consisting of ring-substituted phenols, ascorbic acid, octadecanoic acid (stearic acid), resorcinol, salicylic acid.

10. A package according to claim 1, wherein the leuco dye developer is octadecanoic acid or ascorbic acid.

11. A package according to claim 1, wherein the leuco dye developer has a pKa of between 3 and 10.

12. A package according to claim 1, wherein the leuco dye sensitizer is 2,2'-ethylidenebis (4,6-di-tert-butylphenol).

13. A package according to claim 1, wherein the leuco dye sensitizer is incorporated into the first sealing substrate.

14. A package according to claim 1, wherein the leuco dye sensitizer is incorporated into the second sealing substrate.

15. A package according to claim 1, wherein the leuco dye sensitizer is incorporated into the first and second sealing substrates.

16. A package according to claim 1, wherein the leuco dye sensitizer is applied to the surface of the first sealing substrate.

17. A package according to claim 1, wherein the leuco dye sensitizer is applied to the surface of the second sealing substrate.

18. A package according to claim 1, wherein the leuco dye sensitizer is applied to the surfaces of the first and second sealing substrates.

19. A package according to claim 1, wherein the first substrate is an ethylene vinyl acetate copolymer.

20. A package according to claim 1, further comprising a heat seal defect state existing between the first sealing substrate and the second sealing substrate which produces no visible color change within the heat-seal after defectively heat sealing the first sealing substrate to the second sealing substrate.

* * * * *

UNITED STATES PATENT AND TRADEMARK OFFICE
CERTIFICATE OF CORRECTION

PATENT NO. : 10,822,150 B2  
APPLICATION NO. : 15/578815  
DATED : November 3, 2020  
INVENTOR(S) : Xiangke Shi and Yuan Liu Page 1 of 1

It is certified that error appears in the above-identified patent and that said Letters Patent is hereby corrected as shown below:

On the Title Page

Item (57), ABSTRACT, Line 7, replace "substrata" with -- substrate --

Item (56), FOREIGN PATENT DOCUMENTS, page 2, Line 1, replace "3/1994" with -- 10/1995 --

Item (56), FOREIGN PATENT DOCUMENTS, page 2, Line 3, replace "8/1994" with -- 12/1996 --

Item (56), FOREIGN PATENT DOCUMENTS, page 2, Line 4, replace "4/2003" with -- 10/2004 --

In the Specification

Column 4, Line 20, replace "asleuco" with -- leuco --

Column 4, Line 23, replace "hoalloysite" with -- halloysite --

Column 4, Lines 34-35, replace "acidicolophonium" with -- acid/colophonium --

Column 4, Line 61, replace "skeane" with -- stearic --

Column 5, Line 39, replace "Natty" with -- Natta --

Column 8, Line 27, replace "4,6-di-test-butylphenol" with -- 4,6-di-tert-butylphenol --

In the Claims

Column 9, Lines 57-58, replace "di[bis-(indoyl)ethyleneyl]tetra holophthalides" with -- di[bis-(indoyl)ethyleneyl] tetraholophthalides --

Signed and Sealed this  
First Day of February, 2022

Drew Hirshfeld  
*Performing the Functions and Duties of the*  
*Under Secretary of Commerce for Intellectual Property and*  
*Director of the United States Patent and Trademark Office*

UNITED STATES PATENT AND TRADEMARK OFFICE
CERTIFICATE OF CORRECTION

PATENT NO. : 10,822,150 B2
APPLICATION NO. : 15/578815
DATED : November 3, 2020
INVENTOR(S) : Xiangke Shi and Yuan Liu It is certified that error appears in the above-identified patent and that said Letters Patent is hereby corrected as shown below:

In the Specification

Column 7, Line 62, replace "300° C." with -- 300° F. --

Signed and Sealed this
Seventeenth Day of May, 2022

Katherine Kelly Vidal
Director of the United States Patent and Trademark Office